Dec. 16, 1952    C. GRACCHI    2,621,396
LATHE ATTACHMENT
Filed March 9, 1950    5 Sheets-Sheet 1
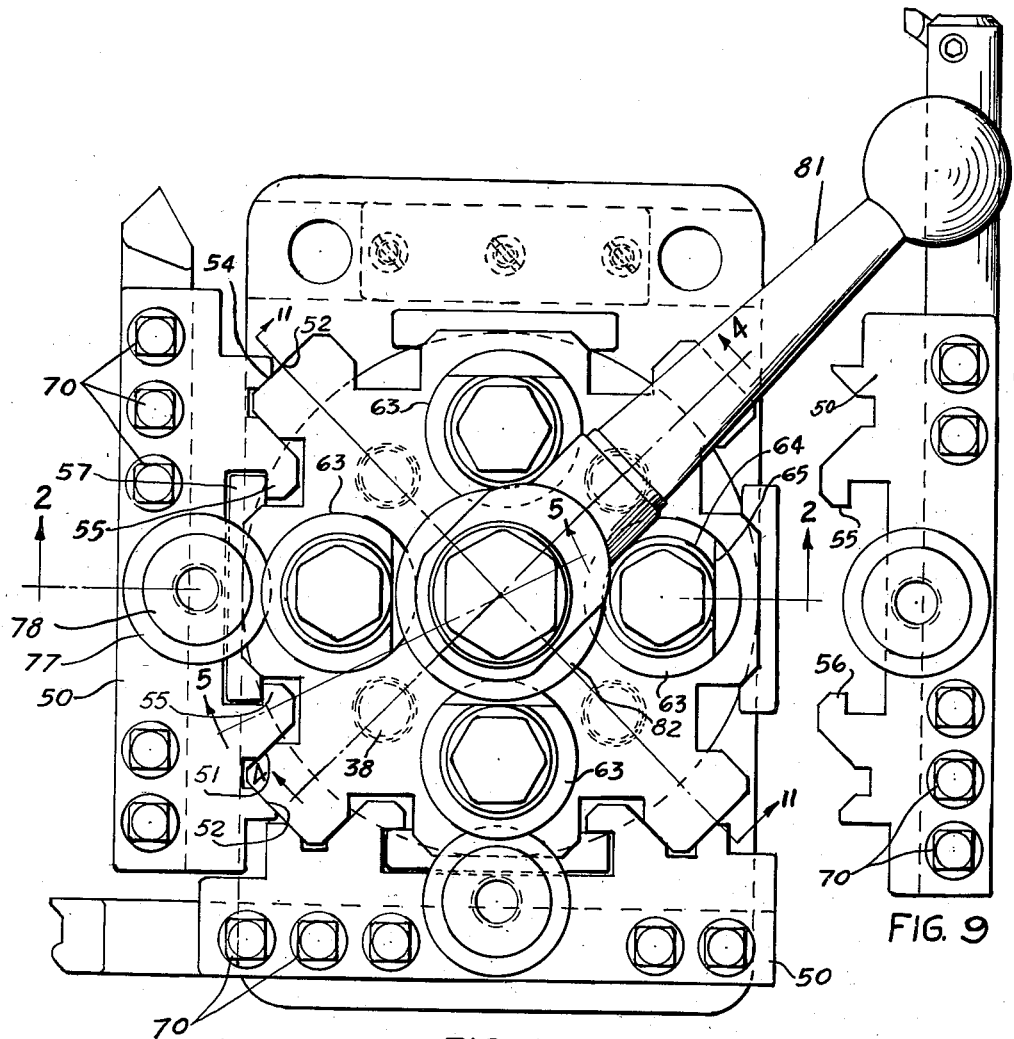
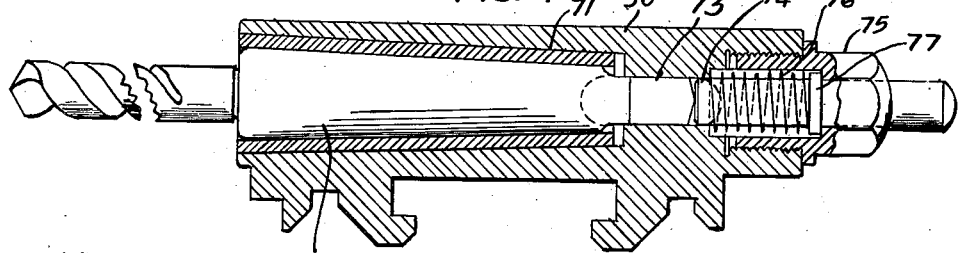
WITNESS    INVENTOR.
*James Ognibene*    CANDIDO GRACCHI
    BY
    *Luther W Hawley*

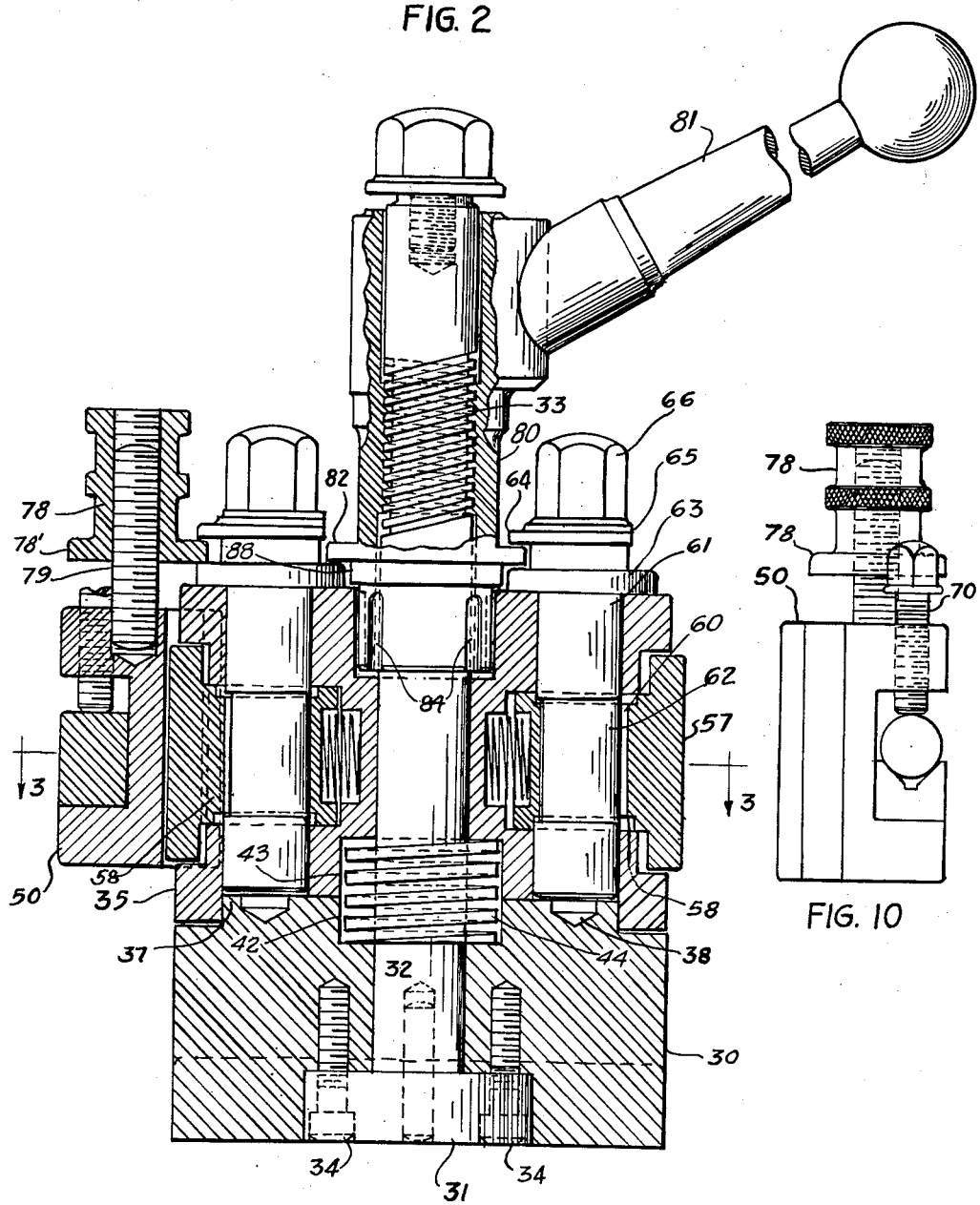

Dec. 16, 1952            C. GRACCHI            2,621,396

LATHE ATTACHMENT

Filed March 9, 1950                                       5 Sheets-Sheet 3

WITNESS                                       INVENTOR.
CANDIDO GRACCHI

BY

Dec. 16, 1952  C. GRACCHI  2,621,396
LATHE ATTACHMENT
Filed March 9, 1950  5 Sheets-Sheet 4

WITNESS
James Ognibene

INVENTOR.
CANDIDO GRACCHI
BY
Luther W. Hamley

Dec. 16, 1952 C. GRACCHI 2,621,396
LATHE ATTACHMENT
Filed March 9, 1950 5 Sheets-Sheet 5

WITNESS
James Agnibene

INVENTOR.
CANDIDO GRACCHI
BY
Luther W Hawley

Patented Dec. 16, 1952

2,621,396

UNITED STATES PATENT OFFICE 2,621,396

LATHE ATTACHMENT

Candido Gracchi, New York, N. Y.

Application March 9, 1950, Serial No. 148,618

3 Claims. (Cl. 29—49)

This invention relates to lathe attachments.

More particularly stated, the invention relates to an attachment adapted for use on an engine lathe to convert the machine into the equivalent of a turret lathe, and also for use on a turret lathe to increase its usefulness and render it more efficient.

On a production job it is often necessary to carry out multiple operations on each piece mounted in the lathe and to repeat such operations on successive pieces. On the usual lathe this requires a tool setter to set the tool for each operation.

This invention has for its salient object to provide a lathe attachment so constructed and arranged that multiple operations can be carried out on each piece of work operated upon and the operations carried out on all of the successive pieces will be identical.

Another object of the invention is to provide in a device of the type specified, means for quickly and accurately adjusting the tool holder support on the base and for easily locking and unlocking said support.

Further objects of the invention will appear from the following specification taken in connection with the drawings which form a part of this application, and in which Fig. 1 is a top plan view of a device constructed in accordance with the invention;

Fig. 2 is a vertical, sectional elevation taken substantially on line 2—2 of Fig. 1, looking in the direction of the arrows;

Fig. 8 is a sectional elevation showing one form of tool mounting in the tool holder;

Fig. 9 is a top plan view of one of the tool holders;

Fig. 10 is an end elevation of the tool holder shown in Fig. 9; and

Figure 3:
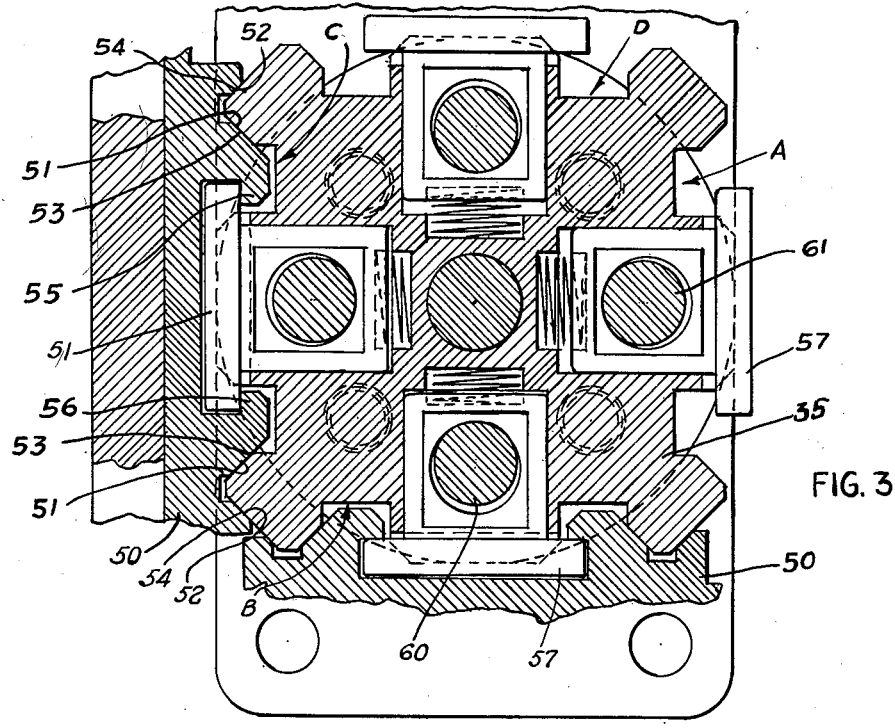
Fig. 3 is a horizontal, sectional elevation taken substantially on line 3—3 of Fig. 2, looking in the direction of the arrows.
Figure 4:
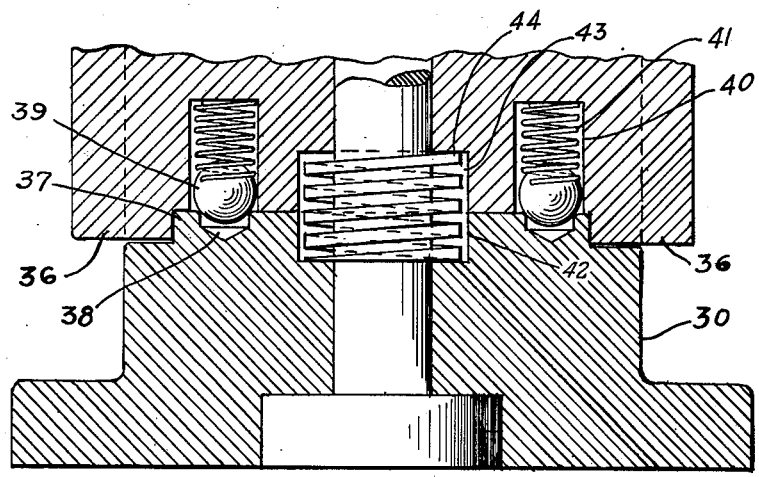
Fig. 4 is a vertical, sectional elevation, taken substantially on line 4—4 of Fig. 1, looking in the direction of the arrows.

In the particular embodiment of the invention illustrated, the lathe attachment has a base block 30 which is fixedly secured to an engine lathe carriage or a production lathe cross slide. The block 30 has a recess in the bottom thereof, in which is secured the head 31 of a spindle 32 which extends upwardly and is threaded at 33 at its upper end. The head is secured to the base by bolts 34.

A tool holder block 35 is mounted on the base 30 and on the spindle 32. The block 35 has a downwardly extending flange 36 which surrounds a reduced upper end 37 of the base and seats thereon.

The upper end surface of the base 30 has a plurality of recesses 38 in which seat balls 39 mounted in upwardly extending bores 40 in the block 35, the balls being pressed downwardly by springs 41 in the bores 40.

The upper surface of the base has a central recess 42 which registers with a recess 43 in the block 35 and receives a spring 44 which tends to separate the base 30 and block 35.

The tool holder block 35 is generally rectangular in shape and has four exactly similar outwardly facing sides A, B, C and D adapted to support tool holders 50.

Each side of the block 35 has at each corner beveled surfaces 51 and 52 engaged by beveled surfaces 53 and 54 of the tool holder. Each tool holder has also oppositely extending lugs 55 and 56 adapted for clamping engagement by the head 57 of a T-shaped clamping member or bolt 58 slidably mounted in the holder 35.

Each member or bolt 58 has a vertical bore 60, in which is mounted a pin 61 having an eccentric portion 62 in the bore 60.

Each pin 61 has a collar 63 which rests on the upper surface of the block 35, and spaced above the collar is a flange 64 which is slabbed off at 65. Above the flange 64 is a hex head 66 by which the pin is turned to lock or unlock the clamping head 57 from the tool holder.

Figure 11:
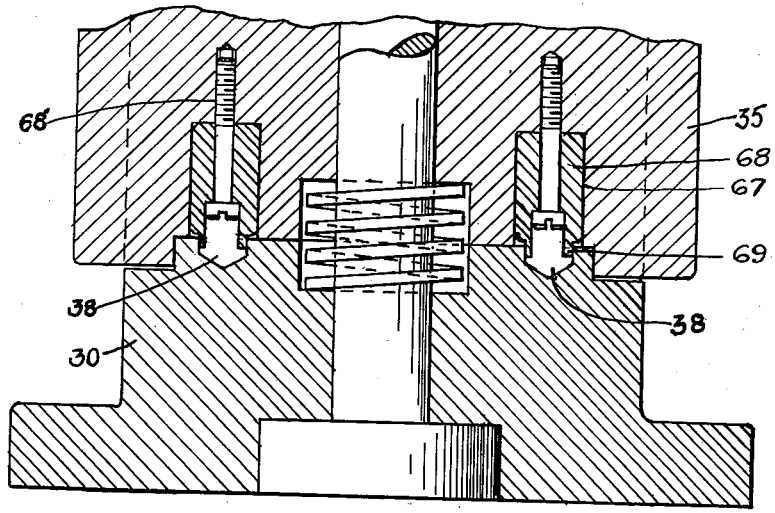
Fig. 11 is a vertical, sectional elevation taken substantially on line 11—11 of Fig. 1, looking in the direction of the arrows.

The block 35, as shown in Fig. 11, has bores 67 in which are inserted plugs 68, which are held in place by screws 68'. The lower reduced end 69 of the plugs 68 seat in two of the recesses 38 in block 30. When the block is released and is raised by the spring 44, the bottoms 69 of the plugs 68 clear the recesses and upper surface of the base and the block 35 can be rotated.

Each tool holder may have a plurality of clamping bolts 70, as shown in Figs. 1 and 2, to clamp the tool in the holder, or the holder may have a tapered bore 71 to receive the tapered shank 72 of a tool, as shown in Fig. 8. The shank 72 has a reduced extension 73 engaged by a pin 74 slidably mounted in a boss 75 threaded into the tool holder, and the pin 74 is surrounded by a spring 76 mounted in the boss 75 and engaging a flange 77 on the pin. By tapping the end of the pin 74, the tool can be loosened and removed.

Each of the tool holders 59 is vertically adjustable on block 35 by a nut 78 which is threaded on a screw 79 threaded into and fixed to the holder 50. Nut 78 has a flange 78' which rests on one of the flanges 63.

The particular feature claimed to be novel in this application is the means for locking the tool holder block 35 and for rotating the block to place the respective tools in position for operation on the work.

Figure 6:
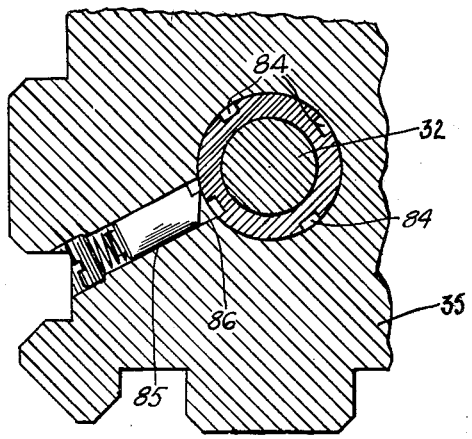
Fig. 6 is a horizontal, sectional elevation taken substantially on line 6—6 of Fig. 5, looking in the direction of the arrows.
Figure 5:
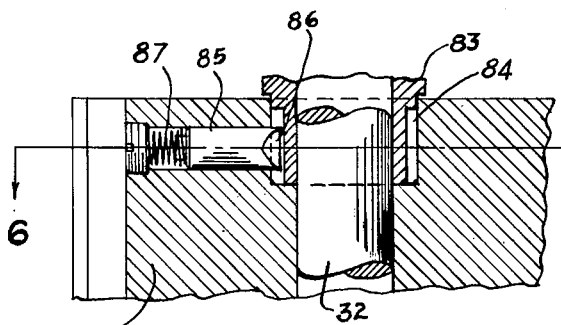
Fig. 5 is a vertical, sectional elevation, partly broken away, taken substantially on line 5—5 of Fig. 1, looking in the direction of the arrows.
Figure 7:
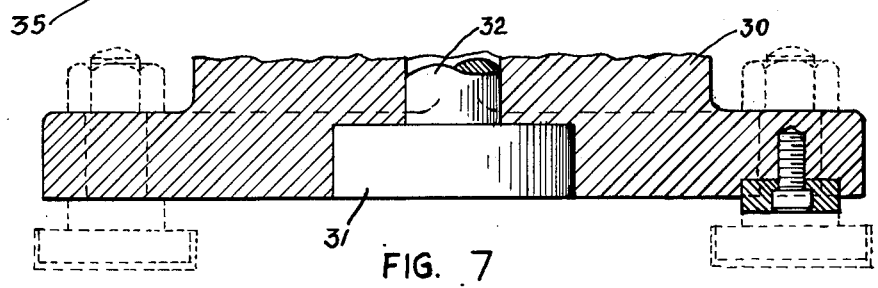
Fig. 7 is a vertical, sectional elevation, partly broken away, showing the lower end portion of the base block.

As shown particularly in Figs. 2, 5 and 6, the spindle 32 has threaded on the end 33 thereof, a sleeve 80 having a handle 81 extending outwardly therefrom. The sleeve 80 has a flange 82 extending laterally over the flanges 63 of pins 61, and the lower end 83 of the sleeve is disposed in an enlarged upper end of the bore in the block 35. The end 83 has a plurality of longitudinal, upwardly extending grooves 84. A pawl or plunger 85 is slidably mounted in the block 35 and has a tooth 86 adapted to enter one of the grooves 84 and the plunger or pawl is pressed inwardly by a spring 87. The sleeve 80 also has a shoulder 88 below the flange 82 adapted to engage the upper surface of the block 35 when the sleeve 80 is screwed down.

When the tool holders have been adjusted on the tool holder block to the desired position of adjustment, the desired tool holder can be moved to operative position with respect to the work by rotating the sleeve 80 and handle 81 in an anti-clockwise direction, viewing Figs. 1 and 6. The initial rotation of the sleeve releases the block 35 and the block is raised by spring 44, thus releasing ends 69 of plugs 68 from recesses 38. Continued anti-clockwise rotation will, by engagement of the pawl or plunger tooth 86 with one of the grooves 84, cause the rotation of the tool block 35 around the axis of the spindle 32 to position the desired tool holder and tool in position for operation on the work.

After this adjustment has been completed, the handle 81 and sleeve 80 are rotated in a clockwise direction and the flange 82 will engage the flanges 63, the shoulder 88 will engage the upper surface of block 35, and the bottoms 67 of pins 61 will enter recesses 38 and lock the tool holder block 35 in adjusted position.

In the manner described, the desired tool and tool holder can be easily and quickly moved to operative position and locked therein.

Although one specific embodiment of the invention has been particularly shown and described, it will be understood that the invention is capable of modification and that changes in the construction and in the arrangement of the various co-operating parts may be made without departing from the spirit or scope of the invention, as expressed in the following claims.

What I claim is:

1. A lathe attachment comprising a base, a tool holder block mounted for rotation on the base, tool holder locking pins carried by the block, a spring between the block and base tending to separate the block from the base and to raise the block, a spindle secured to the base and extending upwardly through the base and tool holder block, a sleeve mounted on the spindle and extending above the block for rotation and longitudinal movement on the spindle, means on the sleeve and spindle adapted to raise the sleeve and release the block when the sleeve is rotated initially through a predetermined arc in anti-clockwise direction, interengaging means on the sleeve and block for causing subsequent anti-clockwise rotation of the sleeve to rotate the block, an annular shoulder on the sleeve adapted to engage the upper side of the block and lower and clamp the block when the sleeve is rotated in a clockwise direction, and an annular flange on the sleeve engageable with the locking pins when the block is in lowered position.

2. A lathe attachment comprising a base, a tool holder block mounted for rotation on the base, tool holder locking pins carried by the block, a spring between the block and base tending to separate the block from the base and to raise the block, a spindle secured to the base and extending upwardly through the base and tool holder block, a sleeve threaded on the spindle and extending above the block for rotation and longitudinal movement on the spindle, an annular shoulder on the sleeve adapted to engage the upper side of the tool holder block and clamp the block when the sleeve is rotated in one direction, an annular flange on the sleeve engageable with the locking pins when the block is in lowered position, and pawl and ratchet devices on the sleeve and block normally inactive during initial anti-clockwise rotation of the sleeve for releasing the block, said pawl and ratchet devices becoming active upon continued anti-clockwise rotation of the sleeve for rotating the block with the sleeve.

3. A lathe attachment comprising a base, a tool holder block mounted for rotation on the base, means between the block and base for forcing the block away from the base, a plurality of tool holders mounted on said block, means including vertical pins for clamping the tool holders to the block, plugs in the block extending through the bottom of the block, recesses in the base top for receiving the lower ends of said plugs, a spindle secured to the base and extending upwardly through the block, a sleeve threaded on the upper end of the spindle, a ratchet and pawl connection between the sleeve and block, an annular shoulder on the sleeve engageable with the upper side of the block when the sleeve is rotated in a clockwise direction to clamp the block to the base, an annular flange on the sleeve above the shoulder engageable with the vertical pins when the block is in lowered position, initial anti-clockwise rotation of the sleeve releasing the block and permitting the block to rise and releasing the plug ends from the base recesses and continual anti-clockwise rotation of the sleeve rendering the pawl and ratchet connection operative for rotating the block with the sleeve.

CANDIDO GRACCHI.

REFERENCES CITED

The following references are of record in the file of this patent:

UNITED STATES PATENTS

| Number | Name | Date |
| --- | --- | --- |
| 466,646 | Woodruff | Jan. 5, 1892 |
| 852,943 | Gehris | May 7, 1907 |
| 2,366,050 | Peterson et al. | Dec. 26, 1944 |